United States Patent [19]

Neumann

[11] Patent Number: 4,612,117
[45] Date of Patent: Sep. 16, 1986

[54] LIQUID FILTER

[76] Inventor: Walter Neumann, Haigerer Strasse 8, D-5900 Siegen, Fed. Rep. of Germany

[21] Appl. No.: 765,118

[22] Filed: Aug. 13, 1985

[30] Foreign Application Priority Data

Aug. 18, 1984 [DE] Fed. Rep. of Germany ....... 3430523

[51] Int. Cl.$^4$ ............................................. B01D 35/16
[52] U.S. Cl. .................................... 210/393; 210/412; 210/427
[58] Field of Search ............... 210/429, 431, 432, 430, 210/359, 391, 393, 411, 412, 425, 427, 402, 424

[56] References Cited

U.S. PATENT DOCUMENTS 3,327,861 6/1967 Carr ..................................... 210/411

Primary Examiner—Frank Sever
Attorney, Agent, or Firm—Young & Thompson

[57] ABSTRACT

A vertically arranged filter drum (6) is installed in the feed chamber (2) of the cylindrical housing (1) of the filter, this drum having a closed upper end and an open lower end. The filter drum (6) consists of an outer (13) and an inner (14) supporting basket exhibiting a screen (15) with passage openings for the liquid to be filtered, as well as of a filtering basket (16) disposed between the two supporting baskets (13, 14), the filtering basket being made of a filter material, for example perforated sheet metal. The filter drum (6) is rotationally driven by a shaft (10), supported in a post (8) on the filter housing (1), and by a motor (11) and is seated with its lower open end with running clearance in the discharge chamber (4) of the filter housing (1). The liquid to be purified enters the feed chamber (2) of the filter (1) via the inlet (3), and the purified liquid leaves the filter through the outlet (5) of the discharge chamber (4). Two backwash ducts with an outlet for the backwashing liquid, which ducts adjoin the jacket surface of the drum (6) and are open toward the latter, are disposed on the inside of the filter housing (1).

7 Claims, 3 Drawing Figures

LIQUID FILTER

Filters having the features of the preamble of claim 1, known, for example, from German Pat. Nos. 1,253,025 and 1,192,913, are utilized industrially in supplying operating water for cooling and usage purposes in order to separate solids of all kinds of types so that trouble and damage are prevented. The filters operate, while maintaining the filtering process, with self cleaning by continuous backwashing of the filter drum or by interval flushing.

The filter drums of these known filters, having the shape of a truncated cone, are equipped with a plurality of filtering elements, up to 3,000 in case of large filters. The filtering elements, designed according to the area of usage of the filter as wire, slotted, perforated elements or perforated disks, are retained by means of threaded rings in corresponding bores in the drum jacket.

In this filter drum construction, the filtering surface based on the total jacket surface area is relatively small so that, to obtain satisfactory filtering effect, large filter drums are required, having filter housings of correspondingly large dimensions. The drums require a complicated, expensive machining on account of the large number of holes for the filtering elements, to be drilled into the drum jacket, and due to the cutting of the internal thread in the holes to thread in the mounting rings for the filtering elements. Because of the repeated reversal of the liquid to be cleaned in the filtering elements as well as the drum and the ensuing friction losses, the conventional filters operating with such drums operate with undesirable pressure losses which must be compensated for by a corresponding increase in the operating pressure of the liquid. The disadvantageous conductance of flow in the filter drum, with the large number of filtering elements, and the contaminants that clog the filtering elements, result in relatively long washing times. Corrosion and erosion in chloride-containing liquids cause damage to the internal thread in the jacket bores of the drum for mounting the filtering elements, so that with an operating pressure of between two and ten bar, with an appreciably large damage to the threaded bore, the filtering element will be forced by the liquid out of the drum jacket into the interior of the drum and consequently the filter is no longer operable. This susceptibility of the drum with respect to damage greatly diminishes the operating life of the drum. Servicing and repair of the filters, in conjunction with an inspection of each individual filtering element, and in certain cases replacement of damaged filtering elements, requires great expenditures in work and time and leads to relatively long downtimes of the filters. For this reason, expensive warehousing comprising complete filters and spare parts, such as drums and filtering elements, is required to maintain the operation of an industrial plant equipped with the conventional filters.

The invention is based on the object of developing a liquid filter distinguished over the conventional filters by a substantially improved filtering efficacy and lower susceptibility to disturbances.

This object has been attained according to the invention by the features in the characterizing portion of claim 1.

Additional advantageous embodiments of the invention are set forth in the dependent claims.

The liquid filter of this invention is distinguished over the conventional filters by the following advantages:

On account of the considerably larger area of filtering surface, based on the outer jacket surface area of the filter drum, the volume of throughput, with the same filter size, can be substantially increased, or, with the same throughput volume, a smaller filter can be chosen. The optimum flow conditions with linear current conductance of the liquid to be purified and/or of the backwashing liquid through the supporting baskets with screen meshwork of large height and width and the interposed filtering basket result in a low pressure loss of the filter, and in a substantially faster and intensive backwashing of the filter surfaces. The tripartite filter drum structure permits rapid and simple exchange of the filtering basket, which is made of perforated sheet metal, for example, within the scope of repair and maintenance work. Finally, the filter drum is distinguished by a long operating life by the use of supporting baskets made of cast aluminum alloys with a hard coating for the filter drum and by the utilization of a filtering basket made of a high-quality filtering material, e.g. a fine-perforated sheet of high-quality steel.

The invention will be described in detail below with reference to an embodiment illustrated in the drawings wherein.

Figure 1:
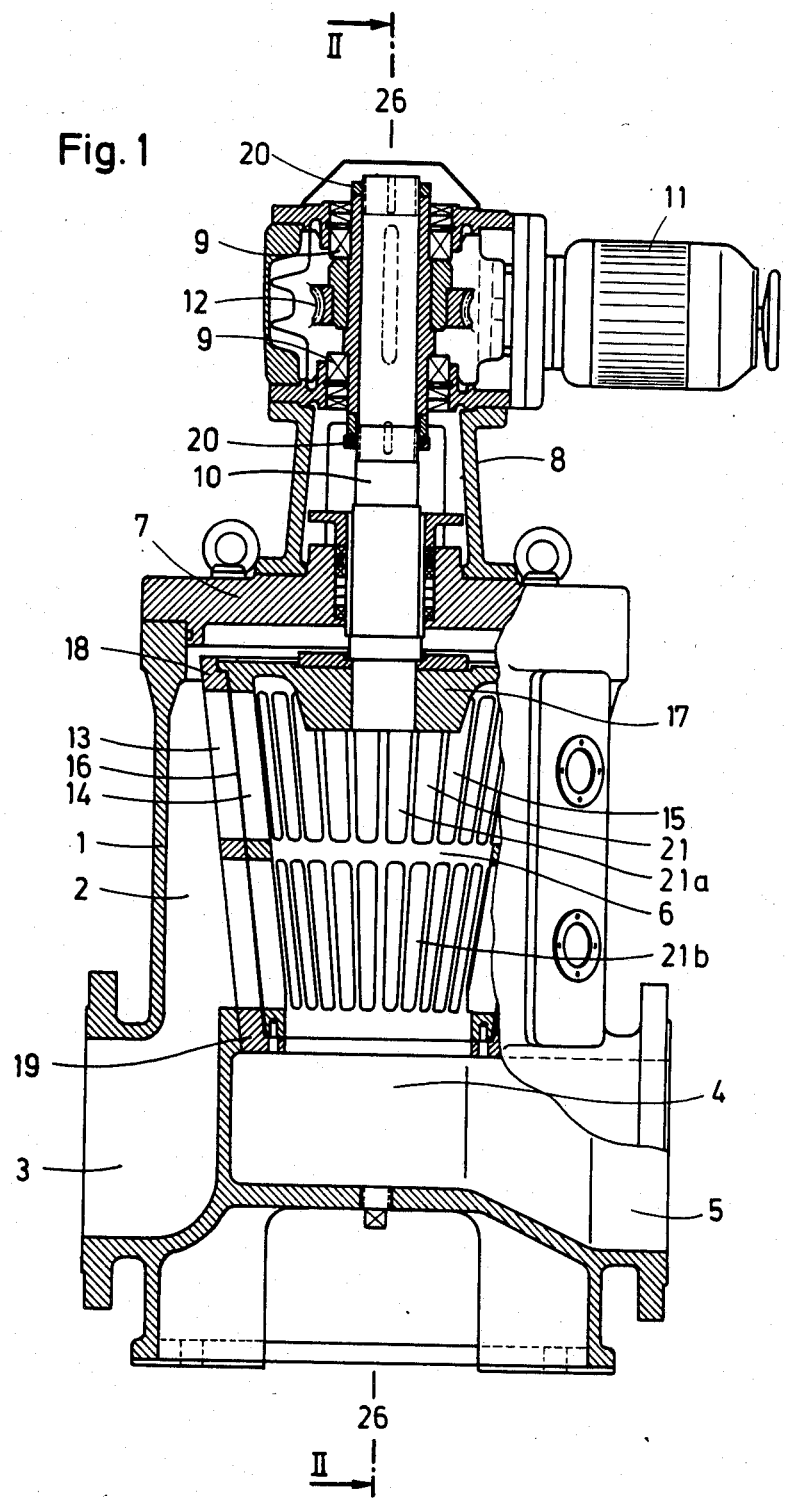
FIG. 1 is a longitudinal section through the filter.
Figure 2:
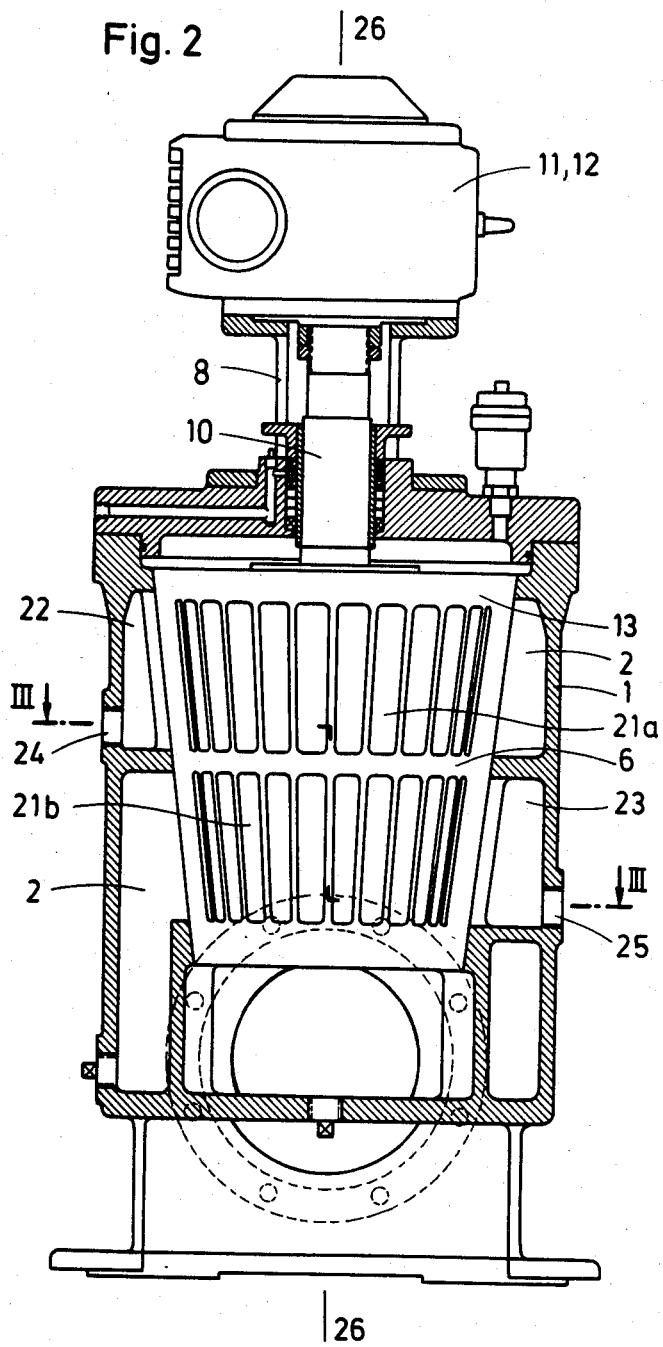
FIG. 2 is a partial longitudinal section, offset by 90°, along line II—II in FIG. 1.
Figure 3:
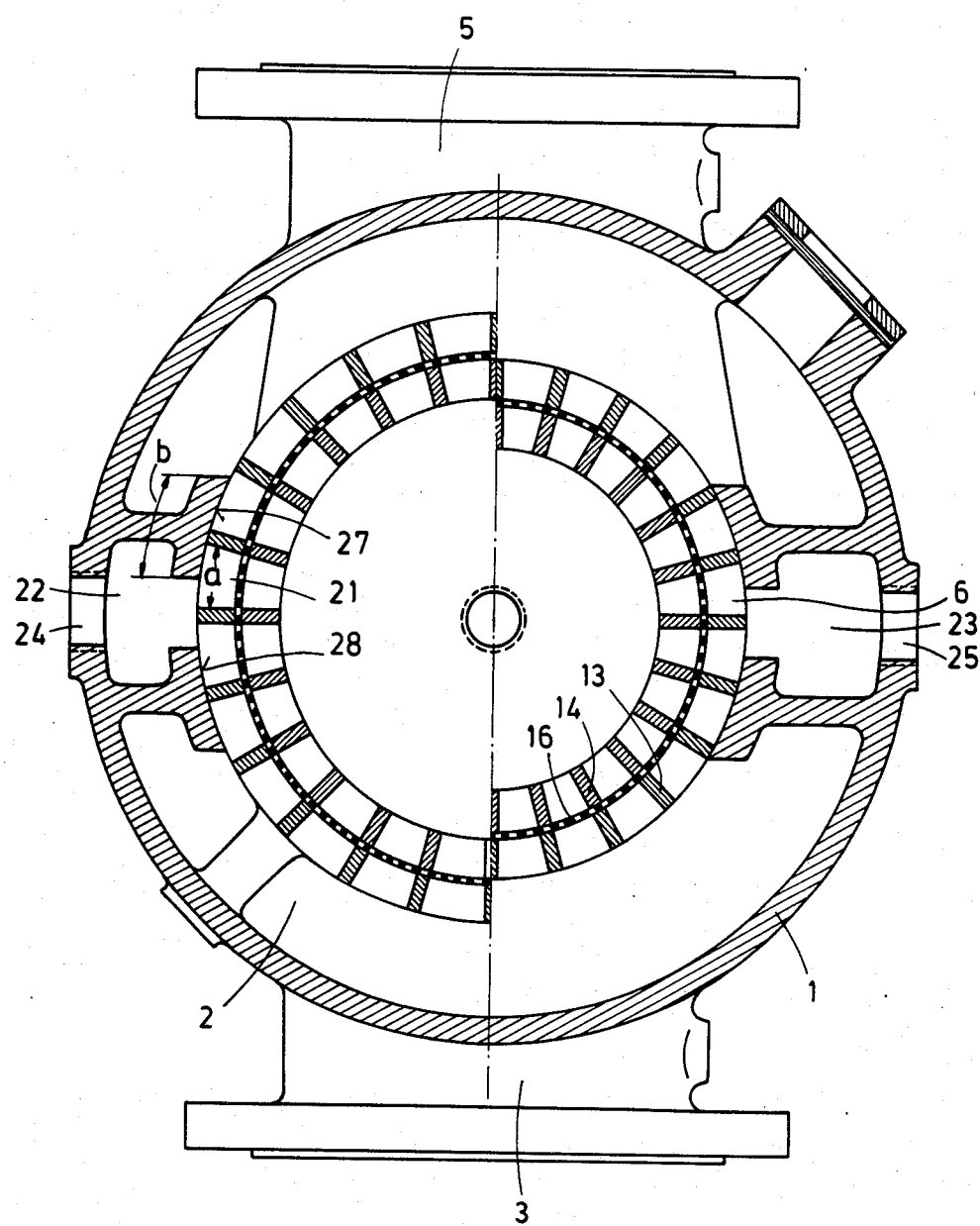
FIG. 3 is a cross section along line III—III in FIG. 2 on an enlarged scale.

The cylindrical housing 1 of the liquid filter according to FIGS. 1-3 is subdivided into a cylindrical feed chamber 2 with an inlet 3 for the contaminated liquid and a cylindrical discharge chamber 4 with an outlet 5 for the purified liquid. The cylindrical discharge chamber 4 is arranged in the lower zone of the filter housing 1 and coaxially to the latter. The inlet 3 and the outlet 5 are in diagonal opposition in the bottom region of the filter housing 1.

A vertical filter drum 6 with the shape of a truncated cone or a cone is installed in the feed chamber 2 of the filter housing 1; this filter drum is rotatably driven by a shaft 10, supported on the housing lid 7 in a post 8 by means of antifriction bearings 9, and by an electric motor 11 with reduction gearing 12. The filter drum 6 with drive mechanism constitutes an assembly unit in conjunction with the housing lid 7.

The filter drum 6 consists of an outer, 13, and an inner truncated-cone-shaped supporting basket 14, these baskets exhibiting a screen 15 with passage openings for the contaminated liquid, as well as of a filtering basket 16, likewise of the shape of a truncated cone, arranged between the two supporting baskets 13, 14. The inner supporting basket 14 rests with its lid 17 in an annular flange 18 disposed at the top edge of the outer supporting basket 13 and with its open, bottom end in an annular flange 19 at the bottom edge of the outer supporting basket 13. The lower end of the outer supporting basket 13 is guided in the upper end of the cylindrical discharge chamber 4 by a free running clearance. In case of enlargement of the running clearance of the filter drum 6 by wear during operation, this clearance can be readjusted by the adjusting nuts 20.

The screen meshwork 21 of the supporting baskets 13, 14 exhibits a rectangular configuration, tapering from the upper toward the lower basket edge, in correspondence with the conical basket shape.

The supporting baskets 13, 14 consist of cast material, preferably a highly wear-resistant aluminum alloy with hard coating, and the filtering basket 16 is made of a perforated sheet of high-quality stainless steel.

Two backwash ducts 22, 23, with an outlet 24, 25 for the backwash liquid, are arranged in diagonal opposition and mutually offset in the direction of the drum axis 26—26 on the inner wall of the filter housing 1; these ducts adjoin the jacket surface of the drum 6 and are open toward the latter.

The liquid to be purified enters under pressure through the inlet 3 into the feed chamber 2 of the filter, flows around the outer jacket of the drum 6, is conducted through the screens 15 of the outer and inner supporting baskets 13, 14 and the filtering basket 16 into the interior of the drum 6, and from there leaves the filter via the discharge chamber 4 and the outlet 5. The impurities contained in the liquid are held back on the filtering basket 16 of the drum 6.

Basically, the filter operates with continuous washing. With each revolution of the filter drum 6, rotating, for example, at a speed of four revolutions per minute, the upper screen meshwork 21a of the supporting baskets 13, 14, with the associated filtering surfaces of the filtering basket 6, passes the top backwash duct 22, and the lower screen meshwork 21b of the supporting baskets 13, 14, with the associated filtering surfaces of the filtering basket 6, passes the bottom backwash duct 23. The difference between the operating pressure of the filter and the atmosphere effects backwashing of the filtering surfaces of the filtering basket 16 countercurrently by means of the liquid flowing from the interior of the filtering drum 6 into the backwash ducts 22, 23. The backwashing liquid, with the contaminants flushed away from the outer jacket of the filtering basket 16, flows via the outlets 24, 25 of the backwash ducts 22, 23 out of the filter. The quantity of flushing water amounts to about 0.5–5% of the filtered liquid, depending on the contamination, and is adjusted by regulating valves, not shown, in the discharge conduits connected to the outlets 24, 25 of the backwash ducts 22, 23.

In order to avoid bypass flow during flushing between the feed chamber 2 of the filter housing 1 and the backwash ducts 22, 23 by way of the flushing chambers constituted by the screen meshwork 21 of the outer supporting basket 13 of the filter drum 6, the maximum width a of the screen mesh 21 of the supporting baskets 13, 14 is dimensioned to be smaller than the width b of the sealing surfaces 27, 28 on both sides of the backwash ducts 22, 23, formed with respect to the outer jacket of the external supporting basket 13 of the filter drum 6.

The filter can also operate with interval flushing, namely in constant washing intervals by means of timed regulation of the check valves installed in the discharge conduits of the backwash ducts 22, 23, or by means of differential pressure control, operating the aforementioned check valves in dependence on the pressure difference between the contaminated liquid entering the filter and the purified liquid discharged from the filter.

I claim:

1. In a filter for liquids, comprising means designed for precluding the need for plural individual filter elements, including a filter drum vertically arranged in the feed chamber of a cylindrical filter housing, this filter drum exhibiting a closed upper end and an open lower end, as well as a jacket provided with passage openings and a filter medium, being rotationally driven by a shaft supported on the filter housing and by a motor, and being seated with its lower, open end with running clearance in a partition between the feed and discharge chambers of the filter housing, with an inlet into the feed chamber and an outlet out of the discharge chamber, as well as with at least one backwash duct adjoining the jacket surface of the drum and being open toward the latter, said at least one duct having an outlet for the backwashing liquid; the improvement comprising a multipartite, exchangeable filter drum (96) with an outer (13) and an inner (14) supporting basket, these baskets defining together a screen (15) with passage openings for the liquid to be filtered, and a filtering basket (16) disposed between the two supporting baskets (13, 14) and made of a filtering material and overlying a plurality of said passage openings of said screen.

2. Filter according to claim 1, characterized by a truncated-cone shape of the two supporting baskets (13, 14) and of the filtering basket (16).

3. Filter according to any one of claims 1 and 2, characterized in that the screen meshwork units (21) of the supporting baskets (13, 14) exhibit a rectangular shape, tapering from the upper toward the lower basket edge in correspondence with the conical basket configuration.

4. Filter according to any one of claims 1–3, characterized by two backwash ducts (22, 23) with an outlet (24, 25) for the backwashing liquid, these ducts being arranged in diagonal opposition and mutually offset in the direction of the drum axis (26—26) on the inner wall of the filter housing (1).

5. Filter according to any one of claims 1–4, characterized in that the maximum width (a) of the screen meshwork units (21) of the supporting baskets (13, 14) is smaller than the width (b) of the sealing surfaces (27, 28) on both sides of the backwash ducts (23, 24), which sealing surfaces are formed with respect to the outer jacket of the outer supporting basket (13) of the filter drum (6).

6. Filter according to any one of claims 1–5, characterized in that the supporting baskets (13, 14) consist of a cast material, preferably an aluminum alloy, with a hard coating.

7. Filter according to claim 1, characterized in that the filtering basket (16) is perforated sheet metal.

* * * * *